US012565386B2

(12) United States Patent
Kwak et al.

(10) Patent No.: US 12,565,386 B2
(45) Date of Patent: Mar. 3, 2026

(54) DEPALLETIZER SYSTEM AND CONTROLLING METHOD FOR THE SAME

(71) Applicants: Kyung Min Kwak, Seoul (KR); Mu Kyun Park, Seoul (KR)

(72) Inventors: Kyung Min Kwak, Seoul (KR); Mu Kyun Park, Seoul (KR)

(73) Assignee: CJ LOGISTICS CORPORATION, Seoul (KR)

( * ) Notice: Subject to any disclaimer, the term of this patent is extended or adjusted under 35 U.S.C. 154(b) by 72 days.

(21) Appl. No.: 18/258,924

(22) PCT Filed: Jan. 5, 2022

(86) PCT No.: PCT/KR2022/000121
§ 371 (c)(1),
(2) Date: Jun. 22, 2023

(87) PCT Pub. No.: WO2022/149839
PCT Pub. Date: Jul. 14, 2022

(65) Prior Publication Data
US 2024/0043227 A1     Feb. 8, 2024

(51) Int. Cl.
*B65G 47/90*          (2006.01)
*B25J 9/16*           (2006.01)
(52) U.S. Cl.
CPC .......... *B65G 47/905* (2013.01); *B25J 9/1697* (2013.01)
(58) Field of Classification Search
CPC ...... B65G 47/905; B65G 43/08; B65G 47/90; B65G 47/915; B65G 2203/041;
(Continued)

(56) References Cited

U.S. PATENT DOCUMENTS 9,008,841 B2 *   4/2015   Fuhlbrigge ............ B25J 9/1687
                                                    700/262
9,102,055 B1     8/2015   Konolige et al.
(Continued)

FOREIGN PATENT DOCUMENTS

EP          3278058          5/2019
JP          2010-005769      1/2010
(Continued)

OTHER PUBLICATIONS

"PCT International Search Report and Written Opinion for International Application No. PCT/KR2022/000121, Date of Mailing: Mar. 25, 2022".
(Continued)

*Primary Examiner* — Nhi Q Bui

(57)          ABSTRACT

The present invention relates to a depalletizing system and a method for controlling the same. The depalletizing system, which picks up a plurality of objects to move the picked up objects to a predetermined position, includes: a camera unit for acquiring image data of tops of the plurality of objects; a controller for performing vision recognition for the acquired image data of tops of the plurality of objects to determine whether two neighboring objects among the plurality of objects are pickable at a time; and a picking robot for at a time picking up the two objects determined as pickable objects at a time to move the picked up objects to the predetermined position.

16 Claims, 11 Drawing Sheets

(58) Field of Classification Search
CPC .... B65G 47/918; B65G 47/907; B65G 59/04;
B65G 61/00; B25J 9/1697; B25J 15/0061;
B25J 15/024; B25J 15/0616
See application file for complete search history.

(56) References Cited

U.S. PATENT DOCUMENTS

| | | | | |
|---|---|---|---|---|
| 9,776,808 | B1 * | 10/2017 | Ooba ................. | B65G 47/1428 |
| 2015/0203304 | A1 * | 7/2015 | Morency ............... | B65G 59/02 |
| | | | | 414/797 |
| 2017/0246744 | A1 * | 8/2017 | Chitta .................... | B25J 9/1687 |
| 2019/0351549 | A1 * | 11/2019 | Suzuki ................. | B25J 15/0042 |
| 2020/0016742 | A1 * | 1/2020 | Ishikawa ............... | B25J 19/023 |

FOREIGN PATENT DOCUMENTS

| | | | |
|---|---|---|---|
| JP | 2010005769 A | * | 1/2010 |
| JP | 2019-151421 | | 9/2019 |
| KR | 10-2018-0040325 | | 4/2018 |
| KR | 10-2019-0105526 | | 9/2019 |

OTHER PUBLICATIONS

Office Action for Korea Patent Application No. 10-2021-0002643, mailed Sep. 1, 2021.
European Search Report for European Patent Application No. 22736816, dated Jun. 28, 2024.
"Ofice Action for Korea Patent Application No. 10-2021-0002643, mailed Sep. 1, 2021."

* cited by examiner

100

110

120

Z

Y

X

120

DEPALLETIZER SYSTEM AND CONTROLLING METHOD FOR THE SAME

TECHNICAL FIELD

The present invention relates to a depalletizing system and a method for operating the same, and more specifically, to a depalletizing system and a method for controlling the same that are capable of determining, among a plurality of objects adjacent to one another on a pallet, the objects pickable at a time through vision recognition, to load the picked up objects on a conveyor line at a time.

BACKGROUND ART

A depalletizer is a device that unloads objects loaded on a pallet from the pallet and thus transfers the objects to a conveyor line. After the objects have been loaded on the conveyor line, automation sorting and loading operations are sequentially performed, and in the process of treating delivery objects, accordingly, it is necessary that the objects have to be loaded fast on the conveyor line through the depalletizer.

Recently, automated depalletizing has been introduced using a robot with a gripper adapted to pick up objects packed with boxes. To perform fast loading, in this case, if two or more objects are automatically identified and then picked up at a time by the gripper, a loading speed may be more improved. However, there are different kinds of delivery objects, and generally, even the objects loaded on the same pallet are irregular in size and shape, so that there is a need to automatically recognize the objects and pick up them at a time.

DISCLOSURE

Technical Problem

It is an object of the present invention to provide a depalletizing system and a method for controlling the same that are capable of recognizing, among a plurality of objects loaded on a pallet, two or more objects adjacent to one another and picking up the recognized objects at a time.

Technical Solution

To accomplish the above-mentioned objects, according to one aspect of the present invention, there is provided a depalletizing system for picking up a plurality of objects to move the picked up objects to a predetermined position, including: a camera unit for acquiring image data of tops of the plurality of objects; a controller for performing vision recognition for the acquired image data of tops of the plurality of objects to determine whether two neighboring objects among the plurality of objects are pickable at a time; and a picking robot for at a time picking up the two objects determined as pickable objects at a time to move the picked up objects to the predetermined position.

According to the present invention, the picking robot may include a robot arm with a plurality of joints, a gripper connected to one end of the robot arm to suck the objects to be picked up with a pneumatic pressure, and clamps coupled to sides of the gripper in such a manner as to be rotatable around rotary shafts in a longitudinal direction of the gripper.

According to the present invention, the gripper may include a plurality of gripper bodies having a plurality of gripping units mounted thereon to suck the objects to be picked up, and the controller descends at least one of the plurality of gripper bodies according to sizes of the objects to be picked up to allow the descended gripper body to come into contact with the objects to be picked up.

According to the present invention, the controller may determine whether the suction of the objects to be picked up through the gripper and the grasping of the objects to be picked up through the clamps are performed simultaneously according to the sizes of the objects to be picked up.

According to the present invention, the image data may include images or videos.

According to the present invention, the controller may produce a depth map from the image data of tops of the plurality of objects, select any object that has the highest top level among the plurality of objects as a reference object according to the produced depth map, and determine whether the reference object and the neighboring object of the reference object are pickable at a time.

According to the present invention, the controller may determine whether the neighboring object of the reference object has the same size and surface image as the reference object to thus determine whether the reference object and the neighboring object are pickable at a time according to the determined result.

According to the present invention, if it is determined that the plurality of objects have the same top level as the reference object, the controller may determine that all of the objects are of the same kind to control the picking robot so that the reference object and the neighboring object are picked up at a time and moved to the predetermined position.

According to the present invention, the controller may receive master information of the plurality of objects and determine whether the reference object and the neighboring object of the reference object are of the same kind based on the master information.

According to the present invention, the master information may include at least a piece of information of kinds, sizes, weights, delivery addresses, production dates, and current position information of the objects.

To accomplish the above-mentioned objects, according to another aspect of the present invention, there is provided a method for controlling a depalletizing system for picking up a plurality of objects to move the picked up objects to a predetermined position, the method including the steps of: acquiring image data of tops of the plurality of objects; performing vision recognition for the acquired image data of tops of the plurality of objects; determining whether two neighboring objects among the plurality of objects are pickable at a time according to a vision recognition result; and at a time picking up the two objects determined as pickable objects at a time to move the two objects to the predetermined position.

According to the present invention, the step of performing vision recognition for the acquired image data of tops of the plurality of objects may include the steps of producing a depth map from the image data of tops of the plurality of objects and selecting any object that has the highest top level among the plurality of objects as a reference object according to the produced depth map, and the step of determining whether two neighboring objects among the plurality of objects are pickable at a time comprises the step of determining whether the neighboring object of the reference object has the same size and surface image as the reference object to determine whether the reference object and the neighboring object are pickable at a time according to the determined result.

According to the present invention, the step of determining whether two neighboring objects among the plurality of objects are pickable at a time may include the step of determining, if it is determined that the plurality of objects have the same top level as the reference object, all of the objects are of the same kind to allow the reference object and the neighboring object to be picked up at a time.

According to the present invention, the method may further include the steps of: receiving master information of the plurality of objects; and determining whether the reference object and the neighboring object are of the same kind based on the master information.

According to the present invention, the step of at a time picking up the two objects determined as pickable objects at a time to move the two objects to the predetermined position is carried out by a picking robot including: a robot arm with a plurality of joints; a gripper connected to one end of the robot arm to suck the objects to be picked up with a pneumatic pressure; and clamps coupled to sides of the gripper in such a manner as to be rotatable around rotary shafts in a longitudinal direction of the gripper.

According to the present invention, the gripper may include a plurality of gripper bodies ascended and descended to suck the objects to be picked up and having a plurality of gripping units mounted thereon, respectively, and the step of at a time picking up the two objects determined as pickable objects at a time to move the two objects to the predetermined position may include the step of descending at least one of the plurality of gripper bodies according to sizes of the objects to be picked up to allow the descended gripper body to come into contact with the objects to be picked up.

According to the present invention, the step of at a time picking up the two objects determined as pickable objects at a time to move the two objects to the predetermined position may include the step of determining whether the suction of the objects to be picked up through the gripper and the grasping of the objects to be picked up through the clamps are performed simultaneously according to the sizes of the objects to be picked up.

Specific other objects of the present invention will be suggested with reference to the description and attached drawings.

Advantageous Effects

According to the present invention, the depalletizing system and the method for controlling the same can identify the pickable objects at a time, without any worker's labor, and pick up them, so that a picking speed is faster than that when only a single object is picked up.

MODE FOR INVENTION

Figure 1:
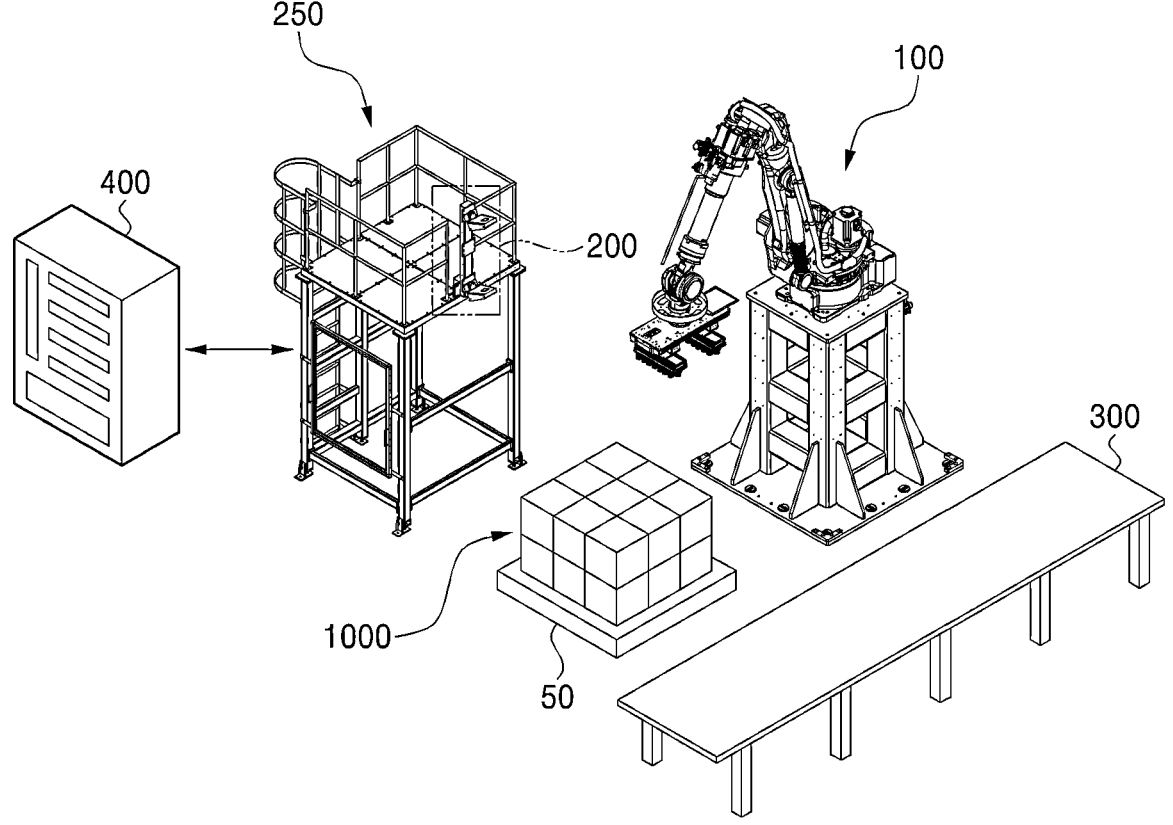
FIG. 1 is a schematic view showing a depalletizing system according to the present invention.

Objects, characteristics and advantages of the present invention will be more clearly understood from the detailed description as will be described below and the attached drawings. However, it is not intended to be exhaustive or to limit the invention to the embodiments as will be disclosed below. Persons skilled in the relevant art can appreciate that many modifications and variations are possible in light of the above teachings. It is therefore intended that the scope of the invention be limited not by this detailed description, but rather by the claims appended hereto. In the description, the corresponding parts in the embodiments of the present invention are indicated by corresponding reference numerals.

When it is said that one element is described as being "connected" or "coupled" to the other element, one element may be directly connected or coupled to the other element, but it should be understood that another element may be present between the two elements. In contrast, when it is said that one element is described as being "directly connected" or "directly coupled" to the other element, it should be understood that another element is not present between the two elements. A term 'and/or' includes a combination of a plurality of relevant and described items or any one of a plurality of related and described items.

The terminology used herein is for the purpose of describing particular embodiments only and is not intended to be limiting. The term 'a' or 'an', as used herein, are defining as one or more than one. The term 'including' and/or 'having', as used herein are intended to refer to the above features, numbers, steps, operations, elements, parts or combinations, and it is to be understood that the terms are not intended to preclude the presence of one or more features, numbers, steps, operations, elements, parts or combinations and added possibilities.

Terms, such as the first, and the second, may be used to describe various elements, but the elements should not be restricted by the terms. The terms are used to only distinguish one element from the other element. For example, a first element may be named a second element without departing from the scope of the present invention.

All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification.

The term 'units' or 'modules', as used herein indicate software components or hardware components such as FPGA or ASIC, and the 'units' or 'modules' perform given operations. However, the 'units' or 'modules' are not limited to software or hardware components. In specific, the 'units' or 'modules' may be disposed on a storage medium addressable, and otherwise, they may serve to play one or more processors. Accordingly, for example, the 'units' or 'modules' may include software components, object-oriented software components, functions, subroutines, segments of program codes, microcodes, circuits, data, database, data structures, tables, arrays, and variables. The functions provided from the components and the 'units' or 'modules' may be combinedly supplied to smaller numbers of components and 'units' or 'modules' or separatedly supplied into additional components or 'units' or 'modules'.

FIG. 1 is a schematic view showing a depalletizing system according to the present invention.

Referring to FIG. 1, the depalletizing system according to the present invention largely includes a picking robot 100, a camera unit 200, and a controller 400.

The picking robot 100 serves to pick up a plurality of objects 1000 loaded on a pallet 50 and moved to a picking area to thus load the objects 1000 on a conveyor line 300. The picking robot 100 includes a robot arm with one or more joints movable in various directions and a gripper connected to one end of the robot arm.

According to the present invention, in specific, the picking robot 100 picks up two or more objects adjacent to one another pickable at a time according to a determination result of the controller 400 and loads the picked up objects on the conveyor line 300.

An operation of loading the plurality of objects 1000 loaded on the pallet 50 on the conveyor line 300 through the picking robot 100 is exemplarily shown in FIG. 1, but the present invention is not limited thereto. For example, the picking robot 100 may move the plurality of objects loaded on one pallet to another pallet or move a plurality of objects moving along the conveyor line to a pallet or another conveyor line. That is, the picking robot 100 may move the plurality of objects 1000 to predetermined positions under the control of the controller 400.

The camera unit 200 acquires image data of tops of the plurality of objects 1000 loaded on the pallet 50. The image data of tops of the plurality of objects 1000, which is acquired by the camera unit 200, is provided to the controller 400, and next, it is determined whether the objects pickable at a time exist among the plurality of objects 1000.

The controller 400 controls the picking operation of the picking robot 100 based on the image data of the objects acquired by the camera unit 200. The controller 400 performs vision recognition for the image data of tops of the objects acquired by the camera unit 200 and determines the objects pickable at a time according to the recognition result.

Figure 2:
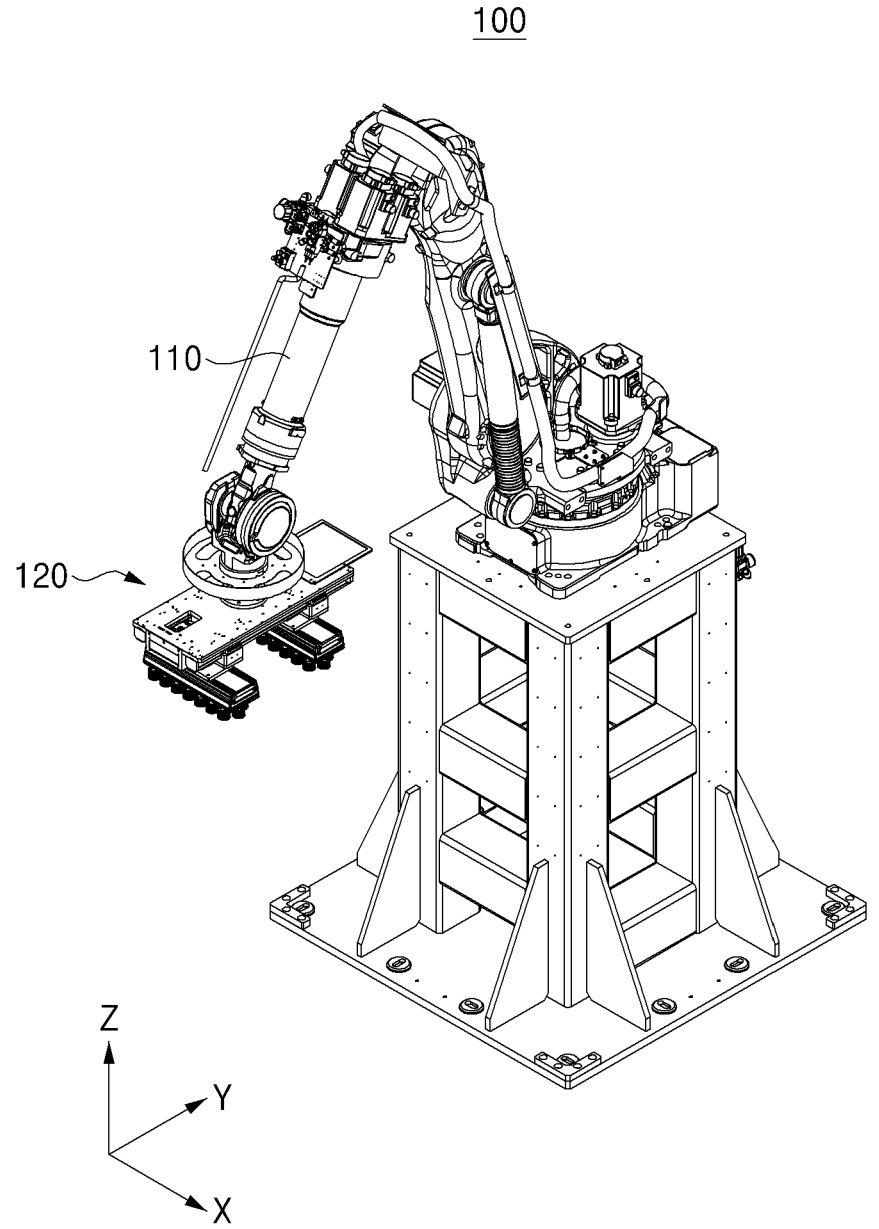
FIG. 2 is a perspective view showing a picking robot of the depalletizing system of FIG. 1.

FIG. 2 is a perspective view showing the picking robot of the depalletizing system of FIG. 1.

Referring to FIG. 2, the picking robot 100 includes a robot arm 110 freely movable and a gripper 120 connected to one end of the robot arm 110.

The robot arm 110 extends from a body 105 of the picking robot 100 and has one or more joints to move the gripper 120 to an arbitrary direction among first to third directions of X, Y, and Z. The robot arm 110 moves the gripper 120 according to a control command provided by the controller 400, grips the pickable objects, and loads the gripped objects on the conveyor line 300.

The gripper 120 sucks tops of the objects to be picked up or clamps sides of the objects to grip the objects. An explanation of a configuration and operation of the gripper 120 will be given with reference to FIGS. 3a to 3c.

Figure 3A:
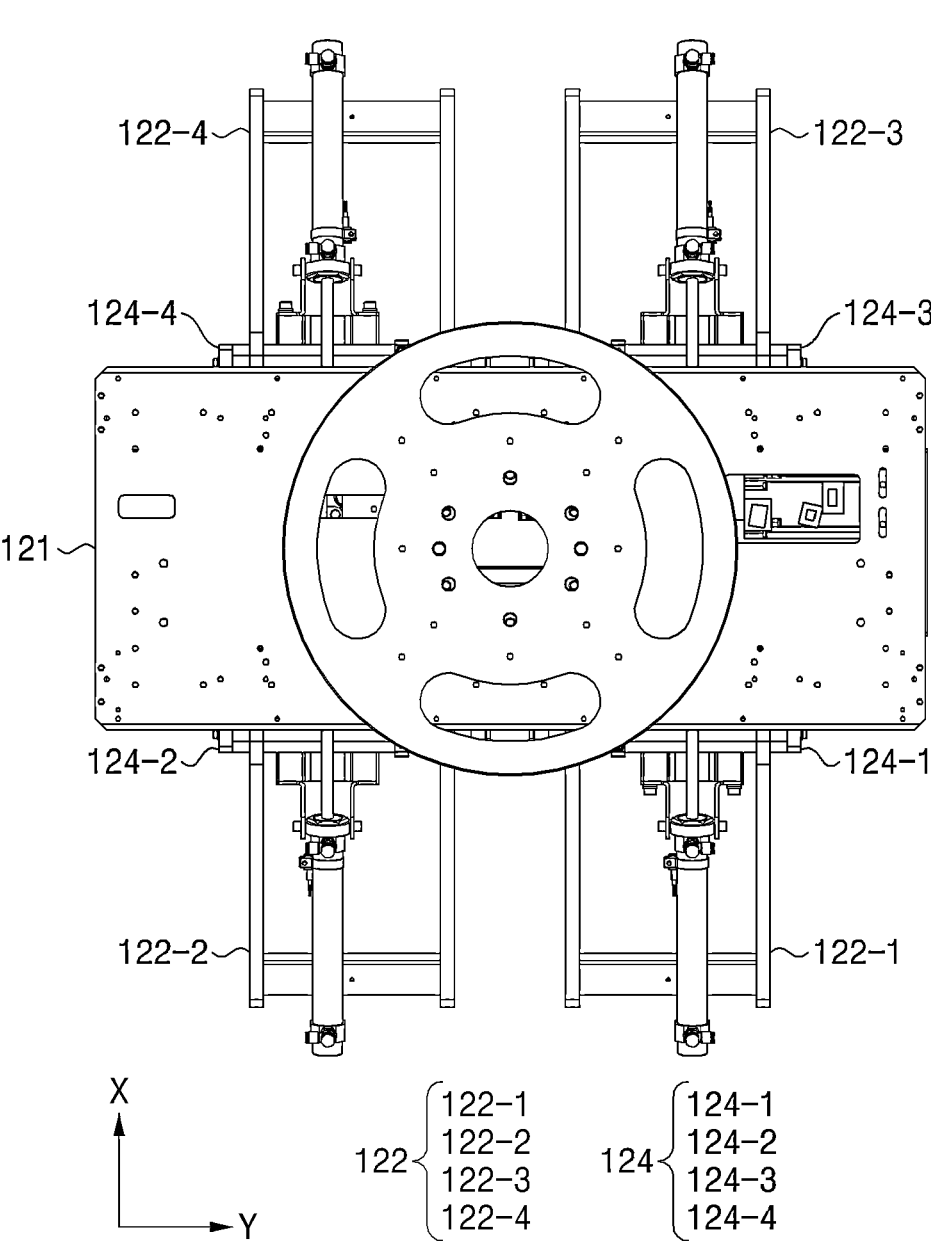
FIGS. 3a to 3c are rear and side views showing a gripper of the picking robot of FIG. 2 in different directions.
Figure 3B:
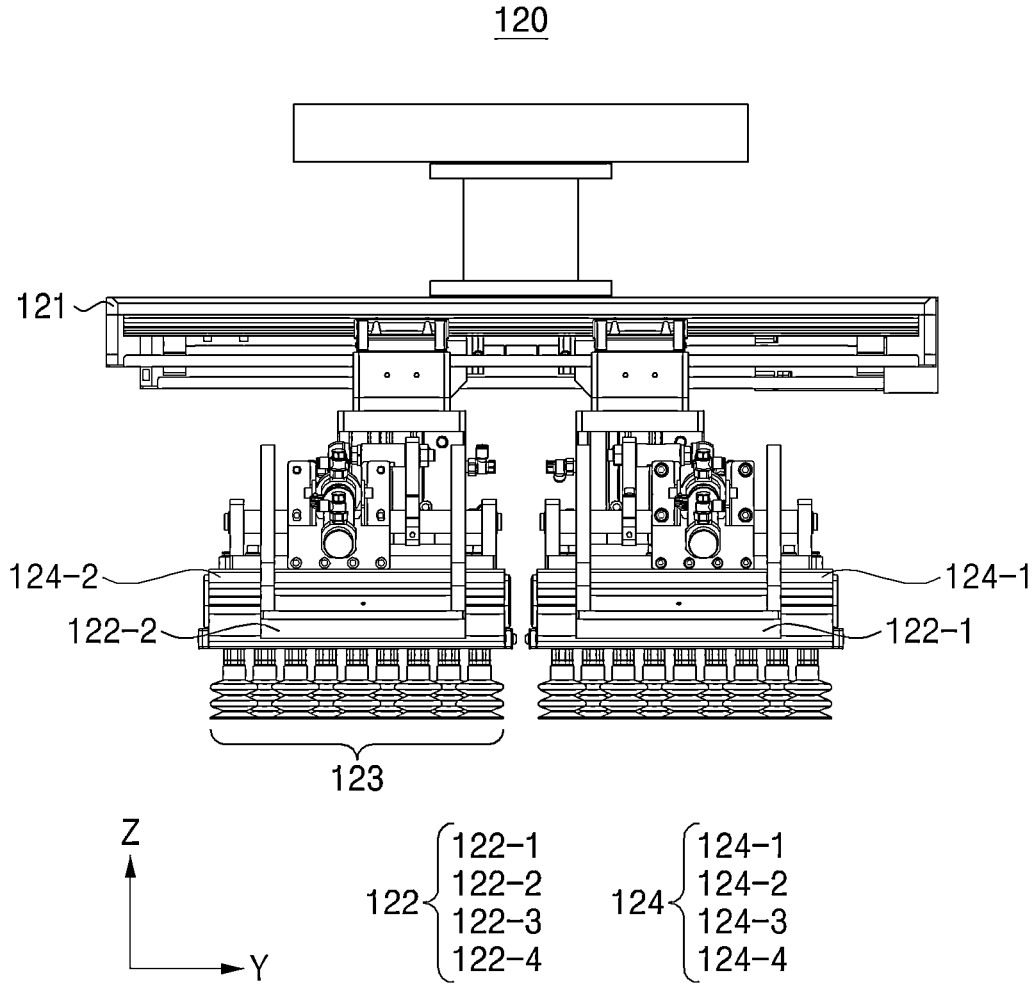
Figure 3C:
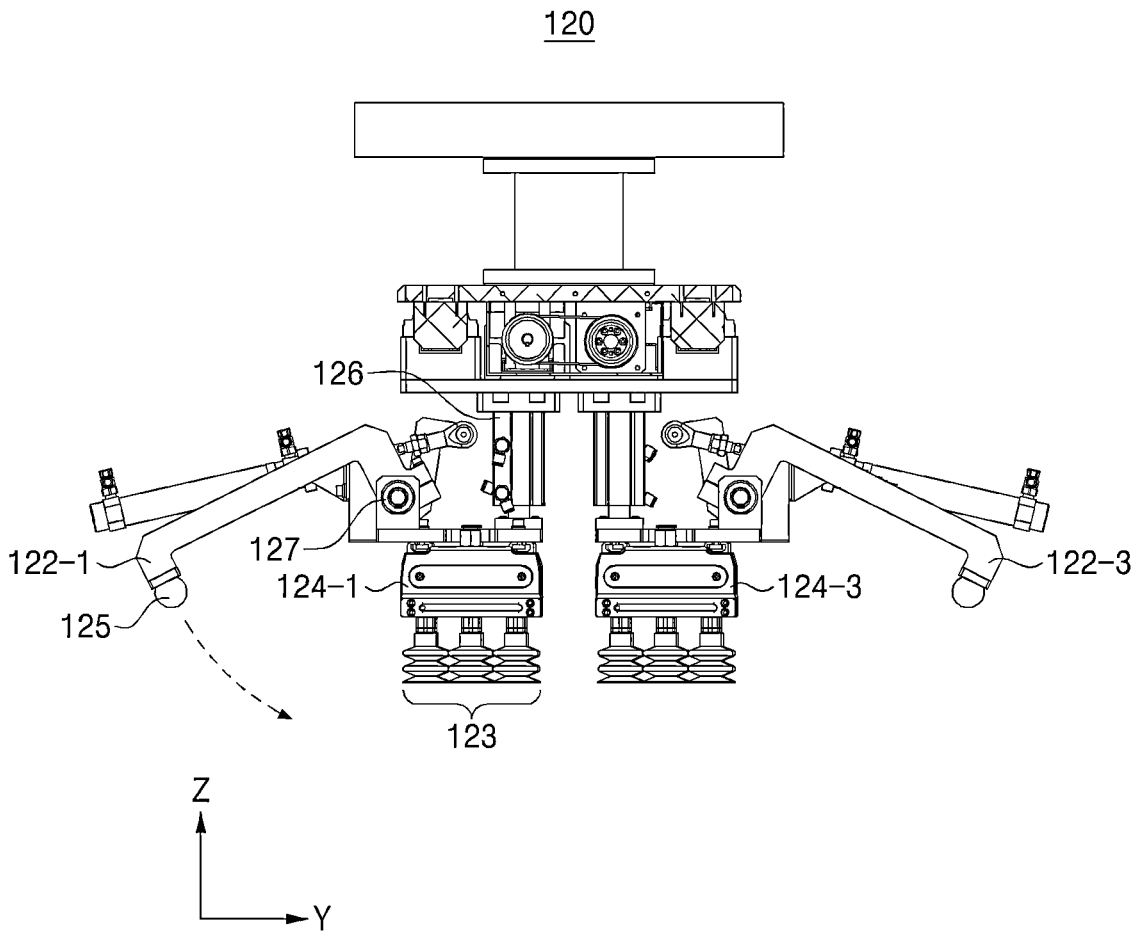

FIGS. 3a to 3c are rear and side views showing the gripper of the picking robot of FIG. 2.

Referring to FIGS. 3a to 3c, the top of the gripper 120, which is viewed in the third direction of Z, is shown in FIG. 3a, the side of the gripper 120, which is viewed in the first direction of X, is shown in FIG. 3b, and the side of the gripper 120, which is viewed in the second direction of Y, is shown in FIG. 3c.

The gripper 120 includes gripper bodies 124 having a plurality of gripping units 123 mounted thereon and clamps 122 mounted on the sides of the gripper bodies 124.

As shown in FIGS. 3a to 3c, the gripper 120 includes four gripper bodies 124-1, 124-2, 124-3, and 124-4 arranged in a 2×2 block form. However, the arrangement is just exemplary, and therefore, the gripper 120 may have a lattice arrangement of four or more or less gripper bodies 124.

The gripper bodies 124 are connected to a plate 121 through connectors 126. According to embodiments of the present invention, when the gripper 120 picks up objects, at least one of the gripper bodies 124-1 to 124-4 protrudes from the plate 121. In specific, for example, the connectors 126 each having a pneumatic cylinder and a piston move to the opposing direction to the plate 121 to allow the gripper bodies 124 to protrude from the plate 121 toward the objects.

The controller 400 selects at least one of the gripper bodies 124 based on widths of the pickable objects identified through the vision recognition and thus controls an ascending operation for the selected gripper body 124. According to embodiments of the present invention, if it is determined through the controller 400 that the plurality of objects adjacent to one another are pickable at a time, the controller 400 selects at least one of the gripper bodies 124 that is descended based on sum of widths of the plurality of objects pickable at a time in the first and second directions of X and Y.

Further, the plurality of gripper bodies 124 are adjustable in distance in the first direction of X and the second direction of Y, respectively. In specific, a distance between the gripper body 124-1 and the gripper body 124-2 in the second direction of Y is adjustable, and a distance between the gripper body 124-1 and the gripper body 124-2 in the first direction of X is adjustable. Two gripper bodies (for example, 124-1 and 124-2) are fitted to one ball screw and thus connected to each other, together with a motor, and through the operation of the motor, the distance between the gripper bodies in the second direction of Y is adjustable.

The distance between the plurality of gripper bodies 124 in the first direction of X or the second direction of Y is controlled according to the widths of the pickable objects in the first direction of X or the second direction of Y.

The plurality of gripping units 123 are coupled to the plurality of gripper bodies 124, respectively. The gripping units 123 serve to suck the pickable objects with pneumatic pressures received from pneumatic pressure supply means connected thereto, to detach the sucked objects with static pressures received from the pneumatic pressure supply means, and to load the objects onto the conveyor line 300.

The clamps 122 are coupled to the gripper bodies 124 in such a manner as to be rotatable around rotary shafts 127 in longitudinal directions of the gripper bodies 124. The clamps 122 rotate in rotating directions R and become close to or away from the objects to be picked up. The clamps 122, which become close to the suckedly picked up objects onto the gripping units 123, come into contact with the picked up objects by means of gripping portions 125, thereby enabling stable picking.

As shown in FIGS. 3a to 3c, the plurality of clamps 122 are provided correspondingly to the plurality of gripper bodies 124-1 to 124-4.

In the picking operation, the clamps 122 can selectively operate. In the picking operation, in specific, the controller 400 rotates, among the plurality of clamps 122-1 to 122-4, at least one pair of clamps (for example, the clamps 122-1 and 122-3 and/or clamps 122-2 and 122-4) facing each other to clamp the objects based on the widths of the pickable objects identified through the vision recognition.

According to the present invention, if it is determined through the controller 400 that the plurality of objects adjacent to one another are pickable at a time, the controller 400 selects the clamps 122 to rotate among the plurality of clamps 122 based on sum of widths of the plurality of objects pickable at a time in the first and second directions of X and Y.

Figure 4:
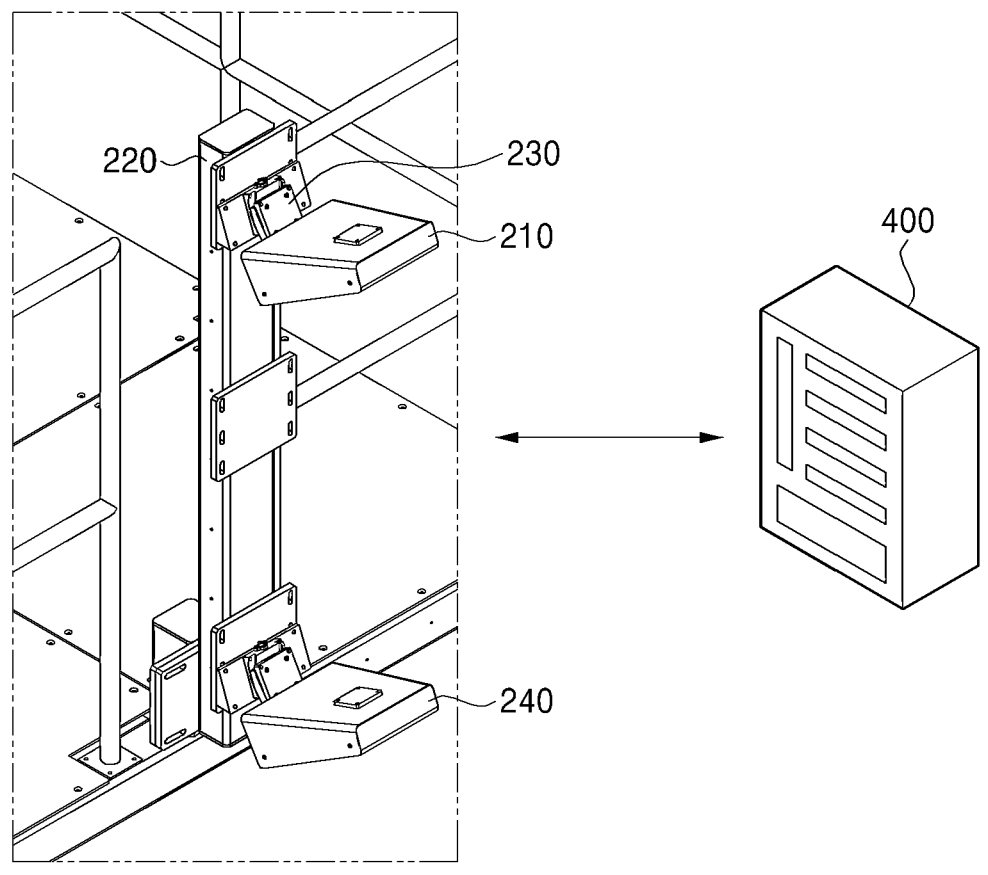
FIG. 4 is a perspective view showing a camera unit and an image processing unit of the depalletizing system according to the present invention.

FIG. 4 is a perspective view showing the camera unit and an image processing unit of the depalletizing system according to the present invention.

Referring to FIG. 4, the camera unit 200 includes an upper camera 210 and a lower camera 240 for acquiring images of tops of the objects 1000 loaded on the pallet 50. The upper camera 210 and the lower camera 240 are disposed on a stand 250 with a given height to acquire the image data of the tops of the objects 1000. The upper camera 210 is coupled to a support frame 220 attached to the stand 250 through an adjustable frame 230 that is adjusted in angle by means of rotation.

The image data of the tops of the objects 1000, which is acquired by the camera unit 200, includes, for example, images or videos.

The upper camera 210 and the lower camera 240 of the camera unit 200, which are disposed in parallel with each other in the third direction of Z, while having different heights, are shown in FIG. 4, but the present invention is not limited thereto. The camera unit 200 may have two cameras disposed in parallel with each other in a horizontal direction or just a single camera to thus acquire the image data of the tops of the objects 1000.

The camera unit 200 transmits the acquired image data of the tops of the objects 1000 to the controller 400. The controller 400 identifies the objects pickable at a time based on the result of the vision recognition through the received image data of the tops of the objects 1000. If the controller 400 identifies the objects pickable at a time, the controller 400 controls the picking robot 100 to allow the objects to be picked up at a time.

The controller 400 is a module that includes at least one or more processors and a set of memories to which the processors access to read and write data and storing commands executed by the processors. For example, the controller 400 includes various computer systems such as a personal computer (PC), a server computer, a workstation, a laptop computer, and the like. According to the present invention, the controller 400 may include a set of a plurality of computer systems.

The picking robot 100, the camera unit 200, and the controller 400 are connected to one another through well known wired/wireless network protocols, which will not be explained below for the brevity of the description.

Figure 5:
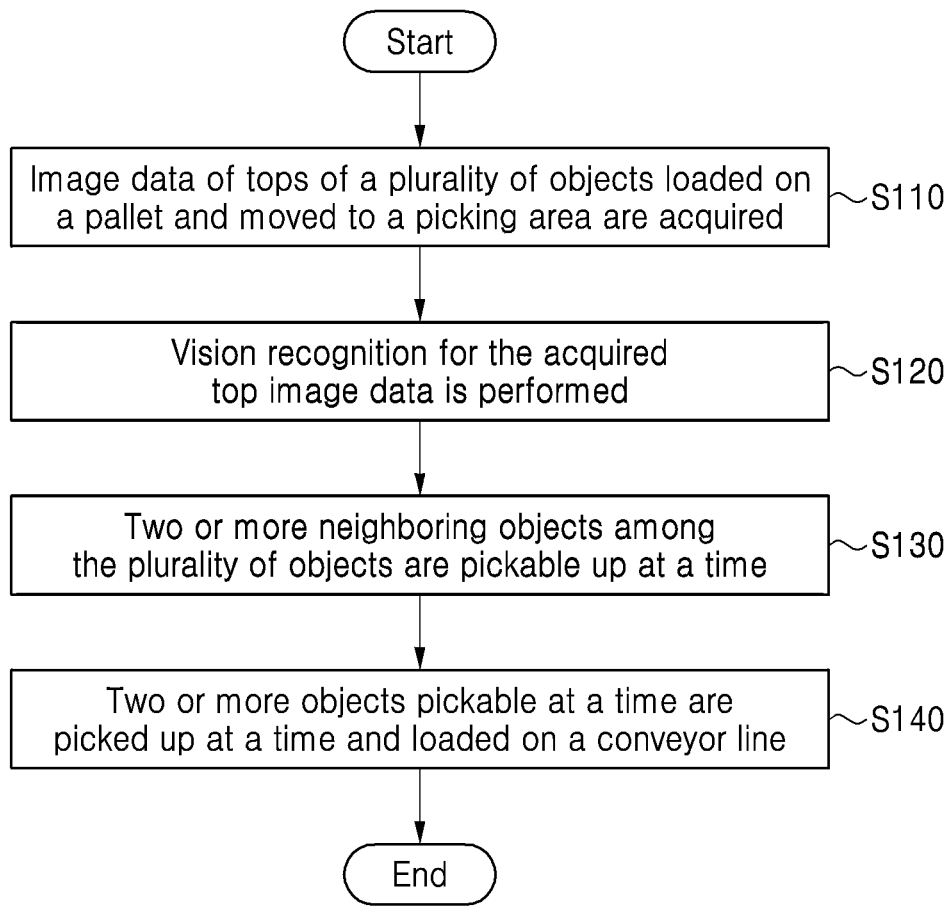
FIG. 5 is a flowchart showing a method for controlling a depalletizing system according to the present invention.

FIG. 5 is a flowchart showing a method for controlling a depalletizing system according to the present invention.

Referring to FIG. 5, the method for controlling a depalletizing system according to the present invention includes the steps of acquiring image data of tops of a plurality of objects loaded on a pallet and moved to a picking area (at step S110), performing vision recognition for the acquired image data of the tops of the plurality of objects (at step S120), determining whether among the plurality of objects, two or more objects adjacent to one another are pickable at a time (at step S130), and picking up the two or more pickable objects at a time and loading the picked up objects on a conveyor line (at step S140).

First, the plurality of objects 1000 loaded on the pallet 50 move to the picking area, and the image data of tops of the plurality of objects 1000 is acquired by the camera unit 200 (at step S110). The picking area indicates an area where picking operations for the objects are carried out by a picking robot 100 of the depalletizing system, and the objects 1000 are loaded on the pallet 50 and moved to the picking area through a fork lift truck, and otherwise, the pallet on which the objects 1000 are loaded is moved to the picking area through the conveyor line.

According to the present invention, a controller 400 receives master information of the plurality of objects 1000 loaded on the pallet 50 after the plurality of objects 1000 have been moved to the picking area. The master information of the plurality of objects 1000 may include kinds, sizes, weights, delivery addresses, production dates, and current position information on the pallet 50 of the objects, but the present invention is not limited thereto. According to the present invention, the controller 400 determines whether two or more objects pickable at a time exist using the information of the objects 1000, which will be described below.

The camera unit 200 is configured to have adjustable frames 230 set at angle so that the camera unit 200 is located toward the tops of the objects 1000 disposed on the picking area. For example, the camera unit 200 acquires two sheets of image data of the tops of the objects 1000 photographed by an upper camera 210 and a lower camera 240. However, the present invention is not limited thereto, and the camera unit 200 may acquire the image data of the tops of the objects 1000 through two cameras disposed in parallel with each other in a horizontal direction or just a single camera.

Next, the acquired image data of the tops of the plurality of objects 1000 by the camera unit 200 is provided to the controller 400, and the vision recognition for the image data is carried out by the controller 400 to determine whether among the plurality of objects 1000, two or more objects adjacent to one another are pickable at a time. The steps will be explained in detail with reference to FIG. 6.

Figure 6:
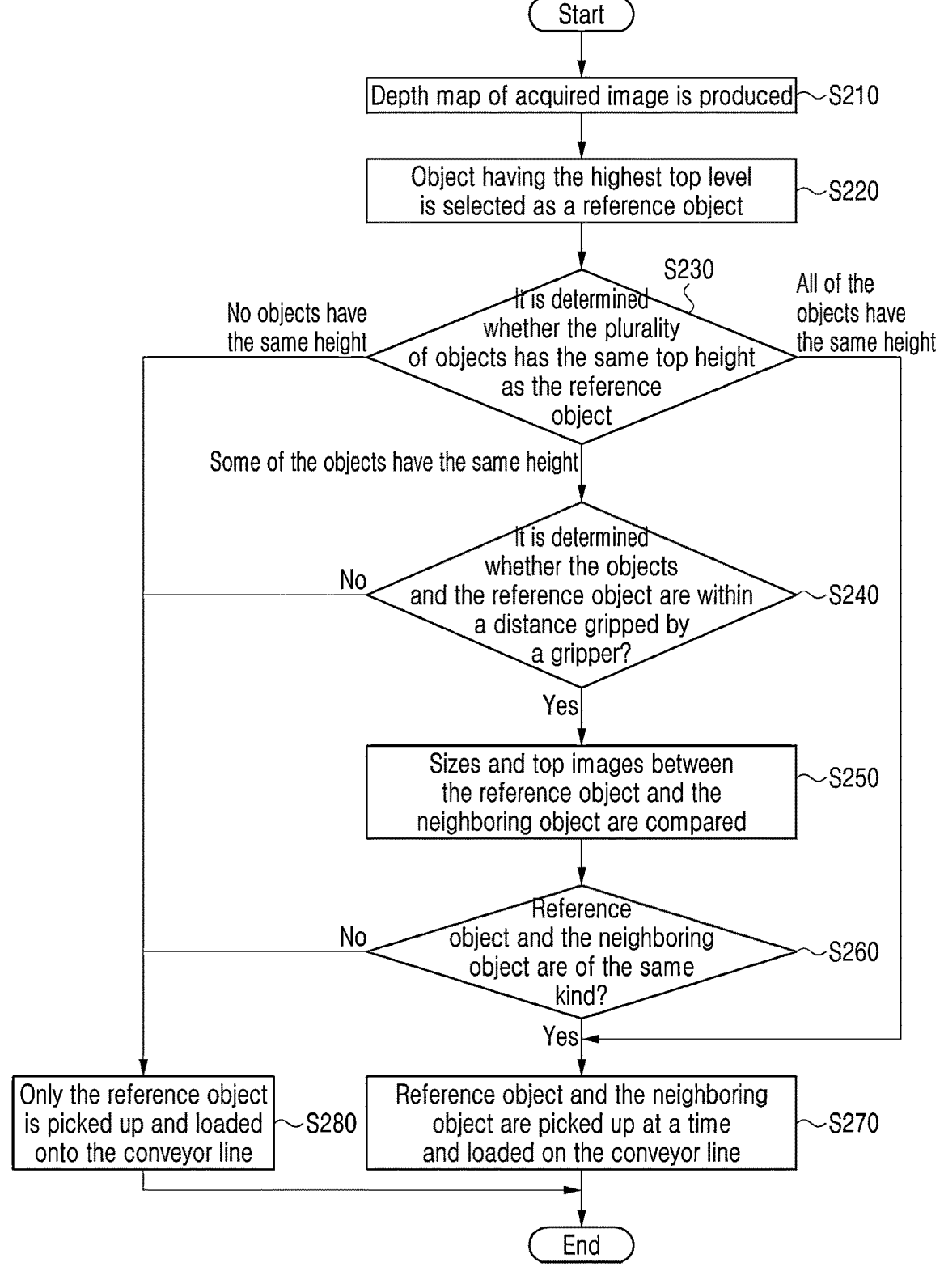
FIG. 6 is a flowchart showing some steps of the method for controlling a depalletizing system according to the present invention.

FIG. 6 is a flowchart showing some steps of the method for controlling a depalletizing system according to the present invention.

Referring to FIG. 6, a depth map of the acquired image is produced through the controller 400 (at step S210).

The depth map is an image that contains information relating to the distance of the camera unit 200 as a viewpoint of the objects 1000 from the surfaces of the objects 1000. In specific, the depth map is produced to obtain height information of the tops of the objects 1000 and to determine whether the objects adjacent to one another exist. In this case, the depth map can be used in determining reference objects to be picked up next time through the controller 400.

Figure 7A:
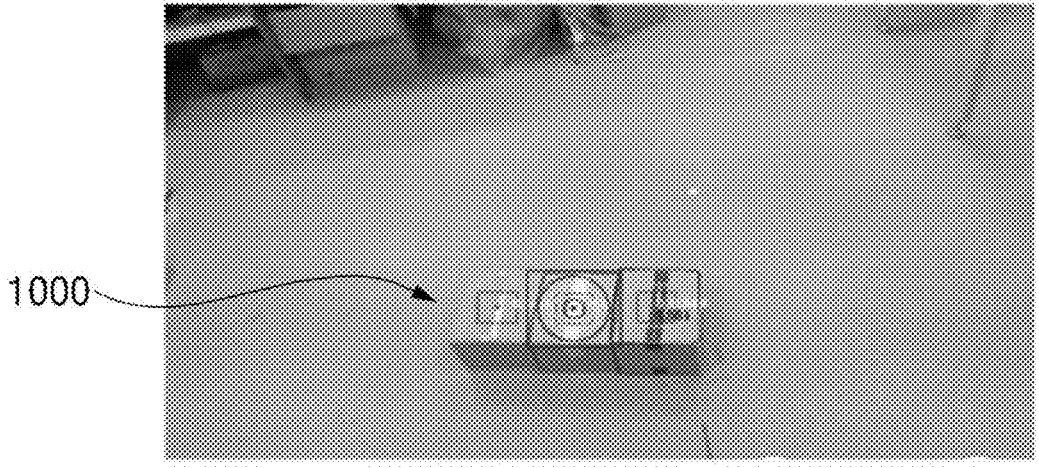
FIGS. 7a and 7b are views showing depth map production conducted by the depalletizing system according to the present invention.
Figure 7B:

FIGS. 7a and 7b are views showing depth map production conducted by the depalletizing system according to the present invention.

Referring to FIGS. 7a and 7b, the image of tops of the objects 1000 placed on a floor, which is photographed by the camera unit 200, is shown in FIG. 7a, and a depth map 1000a, which is produced for the image of FIG. 7a, is shown in FIG. 7b.

As shown in FIG. 7b, the depth map 1000a indicates an area at which a height is highest, that is, an area nearest to the camera unit 200 with a blue color with a low wavelength and an area at which a height is lowest, that is, an area most distant from the camera unit 200 with a red color with a high wavelength. However, the depth map visualized as shown in FIG. 7b is exemplary, and accordingly, the depth map is enough only if it contains data of heights of points of the acquired image data of tops of the objects 1000.

After that, the controller 400 selects the reference object that has the highest top level among the plurality of objects based on the depth map produced (at step S220).

The controller 400 recognizes the shapes of the individual objects distinguished by their respective boxes from the plurality of objects 1000. For example, the controller 400 recognizes the individual objects through edge detection for generally square tops of the individual objects contained in the acquired image data of the tops of the objects 1000, and if necessary, the controller 400 recognizes the individual objects with reference to the depth map produced. The controller 400 recognizes information of the individual objects, identifies the top levels, images, and widths and lengths of the objects from the image data, and stores the identified information together with the information of the individual objects.

The controller 400 selects the reference object having the highest top level based on the obtained information of the individual objects. The reference object is one of the objects that is located at the uppermost position of the plurality of objects 1000 loaded on the pallet 50 and is picked up directly by the picking robot 100, and if the reference object is selected, the picking operation is taken by the picking robot 100.

The controller 400 determines whether the tops of the plurality of objects have the same height as the top of the reference object (at step S230). In this case, the same height may include numerically the same height as the heights of the objects identified from the depth map as well as a height calculated in consideration of a measurement error occurable. Accordingly, it is determined that the object having a height difference in a predetermined range (for example, 5%) from the top height of the reference object has the same height as the reference object.

If it is determined that there is no object having the same height as the reference object, the controller 400 determines that different kinds of objects are loaded on the pallet 50 and allows only the reference object to be picked up, without allowing two or more objects to be picked up at a time, to load the picked up reference object on the conveyor line (at step S280).

Contrarily, if it is determined that only the objects having the same height as the reference object are loaded on the pallet 50, the controller 400 determines that the same kind of objects are loaded on the pallet 50 and allows the picking robot 100 to pick up the objects adjacent to the reference object at a time to load the picked up objects on the conveyor line (at step S270). In this case, the same kind of objects indicate that the same kind of objects as the reference object are packed in boxes with the same size and shape as one another.

If it is determined through the controller 400 that the same kind of objects are loaded on the pallet 50, the picking robot 100 picks up two or more objects including the reference object at a time and loads the picked up objects on the conveyor line until all of the objects loaded on the pallet 50 are loaded on the conveyor line.

According to the present invention, before it is determined through the controller 400 that the same kind of objects are loaded on the pallet 50, the controller 400 may refer to information of the plurality of objects that has been provided thereto. In specific, if it is recognized that the plurality of objects 1000 loaded on the pallet 50 have tops with the same height as one another based on the information of kinds, weights, delivery addresses, and production dates of the objects 1000 which have been provided to the controller 400 when the objects 1000 are moved to the picking area, the recognized result and the information of the objects 1000 are combined to each other, so that the controller 400 determines that the same kind of objects are loaded on the pallet 50. Accordingly, the controller 400 complementarily utilizes the image data of the tops of the objects 1000 acquired through the camera unit 200 and the information of the objects 1000 to improve accuracy in the determination.

Otherwise, if it is determined that some of the plurality of objects 1000 loaded on the pallet 50 have tops with the same height as tops of the reference object, the controller 400 determines whether the objects with the same height as the reference object are pickable at a time, together with the reference object, according to references as will be discussed below.

The controller 400 determines whether the objects and the reference object are within a distance gripped by the gripper 120 (at step S240). Even though the objects with the same height as the reference object exist among the plurality of objects 1000 loaded on the pallet 50, the objects and the reference object may be far away from each other or may not be alignedly loaded with one another, and in this case, the objects and the reference object cannot be picked up at a time. The step of determining whether the neighboring objects of the reference object are within a predetermined separation distance from the reference object and within a perpendicular distance with respect to the reference object through the controller 400 will be explained with reference to FIG. 8.

Figure 8:
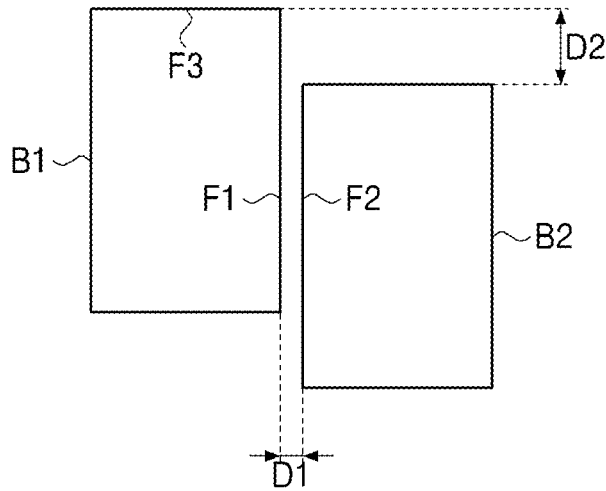
FIG. 8 is a view showing a perpendicular distance determination conducted by the depalletizing system according to the present invention.

FIG. 8 is a view showing separation distance and perpendicular distance determinations conducted by the depalletizing system according to the present invention.

Referring to FIG. 8, the reference object B1 and another object B2 are adjacent to each other. A first surface F1 of the reference object B1 faces a second surface F2 of the neighboring object B2. That is, the first surface F1 and the second surface F2 face each other, while having no object placed between the reference object B1 and the neighboring object B2.

A distance between the first surface F1 and the second surface F2 is defined as a separation distance D1. If the reference object B1 and the neighboring object B2 are arranged in a state where the first surface F1 and the second surface F2 are not parallel with each other, a distance between the facing surfaces F1 and F2 is measured in a plurality of positions, and the mean value of the measured values is determined as the separation distance D1.

A perpendicular distance D2 between the reference object B1 and the neighboring object B2 indicates a degree of misalignment between the reference object B1 and the neighboring object B2, which is defined as a distance between an extension line from a surface F3 connected to the first surface F1 of the reference object B1 and a surface F4 connected to the second surface F2 of the neighboring object B2.

Only when at least one of the separation distance D1 and the perpendicular distance D1 between the reference object B1 and the neighboring object B2 is within a predetermined reference value, the controller 400 determines whether the reference object B1 and the neighboring object B2 are pickable at a time. However, if it is determined that at least one of the separation distance D1 and the perpendicular distance D1 between the reference object B1 and the neighboring object B2 is over the predetermined reference value, the controller 400 determines that the reference object B1 and the neighboring object B2 cannot be picked up at a time. Further, if there is no neighboring object satisfying the above-mentioned conditions of the separation distance D1 and the perpendicular distance D1, the controller 400 controls the picking robot 100 so that only the reference object is picked up and loaded on the conveyor line (at step S280).

The controller 400 compares the width and length of the reference object B1 to those of the neighboring object B2 and the top image of the reference object B1 to that of the neighboring object B2 (at step S250). The controller 400 compares the sizes and the top images between the reference object B1 and the neighboring object B2 based on the image data of tops of the plurality of objects 1000 acquired before.

If it is measured that the width and length of the reference object B1 are within a predetermined range (for example, 5%) with respect to those of the neighboring object B2, the controller 400 determines that the reference object B1 and the neighboring object B2 have the same size as each other.

Further, the comparison between top images of the reference object B1 and the neighboring object B2 is carried out through the comparison between the images printed on tops of the boxes of the reference object B1 and the neighboring object B2 and tape images attached to the boxes thereof.

According to the present invention, the controller 400 may utilize pre-stored master information of objects in comparing the sizes and images between the reference object B1 and the neighboring object B2.

Figure 9:
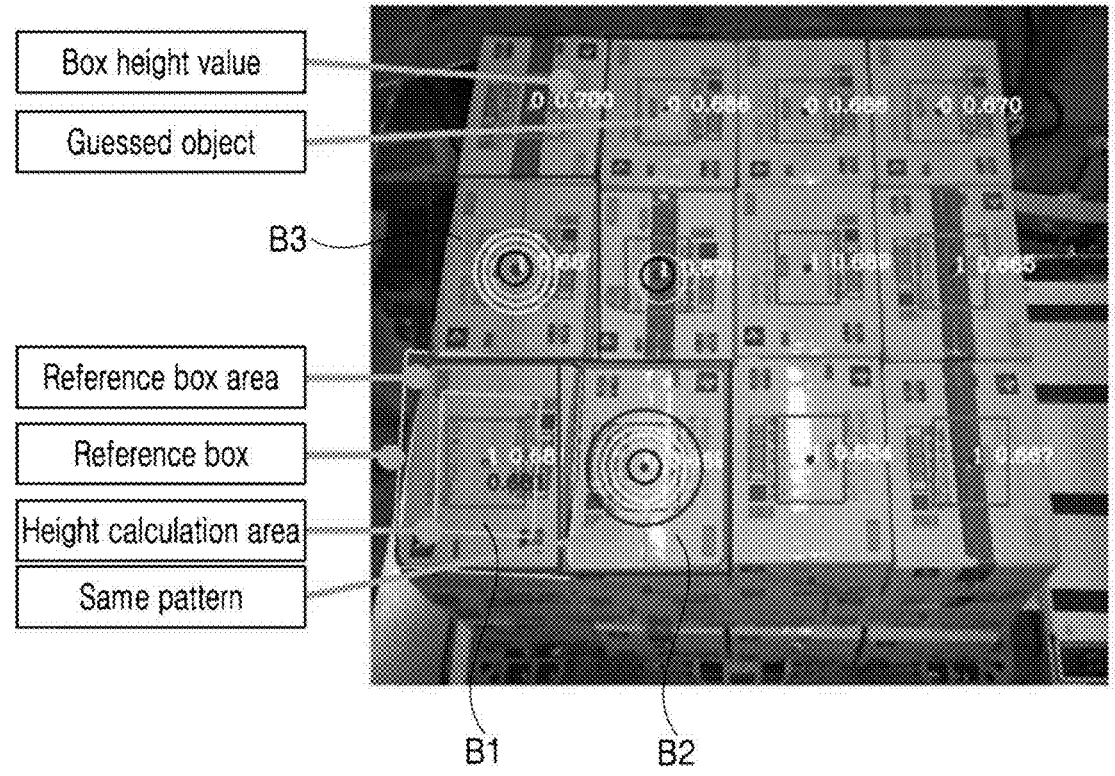
FIG. 9 is a photograph showing a determination as to whether objects are pickable at a time that is conducted by the depalletizing system according to the present invention.

FIG. 9 is a photograph showing a determination as to whether objects are pickable at a time that is conducted by the depalletizing system according to the present invention.

Referring to FIG. 9, the step of determining whether the reference object B1 and the neighboring objects B2 and B3 are pickable at a time is visualized. The controller 400 determines whether the neighboring objects B2 and B3 with the surfaces facing the reference object B1 among the plurality of objects 1000 loaded on the pallet 50 are of the same kind as the reference object B1. If it is determined that the neighboring object B2 satisfies the same size and image conditions as the reference object B1, the neighboring object B2 is determined as a pickable object at a time, together with the reference object B1.

A graphic expression as shown in FIG. 9 is just exemplary, and accordingly, of course, the controller 400 may perform the determination only through internal data processing, without any output of such a graph.

The controller 400 determines whether the reference object B1 and the neighboring object B2 are of the same kind through the comparison between the sizes and top images between the reference object B1 and the neighboring object B2, and if it is determined that they are of the same kind (at step S260), the controller 400 controls the picking robot 100 so that the reference object B1 and the neighboring object B2 are picked up at a time and loaded on the conveyor line (at step S270). Otherwise, if it is determined that they are not of the same kind, the controller 400 controls the picking robot 100 so that only the reference object B1 is picked up and loaded onto the conveyor line (at step S280).

In summary, the depalletizing system according to the present invention determines the object having the highest top level as the reference object through the vision recognition for the plurality of objects 1000 loaded on the pallet 50 and moved to the picking area, picks up the object having the same shape as the reference object among the neighboring objects and the reference object at a time, and loads the picked up objects on the conveyor line 300.

Accordingly, the pickable objects at a time are identified, without any worker's labor, and picked up. In this case, a picking speed is faster than that when a single object is picked up. For example, if pickable objects at a time on one pallet are occupied to a rate of 60%, the depalletizing system according to the present invention may reduce the picking time by about 70% when compared to the existing system that picks up a single object.

Figure 10:
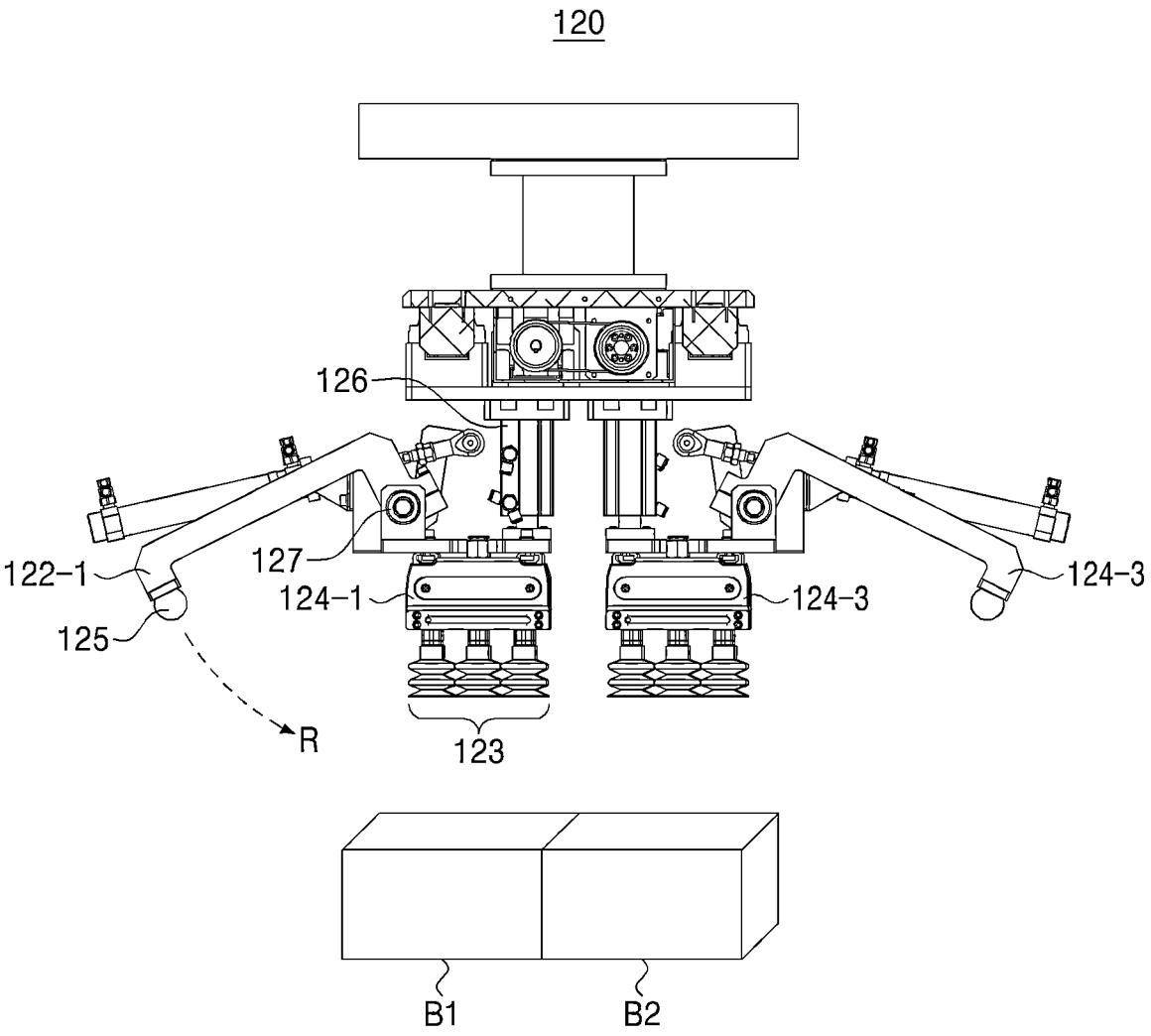
FIG. 10 is an exemplary view showing picking conducted by the depalletizing system according to the present invention.

FIG. 10 is an exemplary view showing the picking work conducted by the depalletizing system according to the present invention.

Referring to FIG. 10, the reference object B1 and the neighboring object B2 are picked up at a time through the control of the controller 400.

The controller 400 aligns the center of the pickable objects with the center of the gripper 120 before picking up the objects. If the pickable object is just one reference object B1, the center of the reference object B1 is aligned up and down with the center of the gripper 120. If the pickable objects include the reference object B1 and the neighboring object B2, the center of the gripper 120 is aligned up and down with the center of the two objects in consideration of the separation distance (See D1 of FIG. 8) and the perpendicular distance (See D2 of FIG. 8) of the two objects.

The controller 400 selectively operates some of the four gripper bodies 124 according to the widths of the first and second directions of X and Y of the objects B1 and B2 pickable at a time. The selected gripper bodies among the four gripper bodies 124 are descended until the gripping units 123 come into contact with the objects and grip the objects. According to the present invention, the distance between the two gripper bodies (for example, the gripper bodies 124-1 and 124-2 or the gripper bodies 124-1 and 124-3) is increased or decreased.

Further, at least one pair of clamps 122-1 and 122-3 and/or one pair of clamps 122-2 and 122-4 facing each other in the first direction of X additionally operate according to the widths of the objects pickable at a time. In specific, in a state where the objects are sucked on the gripping units 123, at least one pair of clamps 122-1 and 122-3 and/or one pair of clamps 122-2 and 122-4 rotate around their rotary shafts 127 in the rotating directions R and grasp the objects, thereby enabling stable picking. Otherwise, if the pickable objects have smaller widths than a predetermined width, that is, smaller widths than the width of the gripper 120 in the first direction of X to cause the grasping through the clamps 122 to be ineffective, the controller 400 does not operate the clamps 122 in the picking process.

If the objects are gripped through the gripper 120, the robot arm 110 moves the gripper 120 to the conveyor line 300. The gripper 120 releases the objects from their gripping state on the conveyor line 300. That is, the clamps 122 are open, and the gripping units 123 receive static pressures, so that the objects fall down onto the convey line 300.

Up to now, the preferred embodiments of the present invention have been disclosed in the specification and drawings. Therefore, persons skilled in the relevant art can appreciate that many modifications and variations are possible in light of the above teachings. It is therefore intended that the scope of the invention be limited not by this detailed description, but rather by the claims appended hereto.

| [Explanations of Reference Numerals] | |
| --- | --- |
| 100: Picking robot | 110: Robot arm |
| 120: Gripper | 200: Camera unit |
| 210: Upper camera | 220: Support frame |
| 230: Adjustable frame | 240: Lower camera |
| 300: Conveyor line | 400: Controller |

The invention claimed is:

1. A depalletizing system for picking up a plurality of objects to move the picked up objects to a predetermined position, comprising:

a camera unit for acquiring image data of tops of the plurality of objects;

a controller for performing vision recognition for the acquired image data of tops of the plurality of objects to determine whether two neighboring objects among the plurality of objects are pickable at a time; and a picking robot for at a time picking up the two objects determined as pickable objects at a time to move the picked up objects to the predetermined position, wherein the controller produces a depth map from the image data of tops of the plurality of objects, selects any object that has the highest top level among the plurality of objects as a reference object according to the produced depth map, and determines whether the neighboring object of the reference object has the same size and surface image as the reference object to determine whether the reference object and the neighboring object are pickable at a time according to the determined result.

2. The depalletizing system according to claim 1, wherein the picking robot comprises:

a robot arm with a plurality of joints;

a gripper connected to one end of the robot arm to suck the objects to be picked up with a pneumatic pressure; and clamps coupled to sides of the gripper in such a manner as to be rotatable around rotary shafts in a longitudinal direction of the gripper.

3. The depalletizing system according to claim 2, wherein the gripper comprises a plurality of gripper bodies having a plurality of gripping units mounted thereon to suck the objects to be picked up, and the controller descends at least one of the plurality of gripper bodies according to sizes of the objects to be picked up to allow the descended gripper body to come into contact with the objects to be picked up.

4. The depalletizing system according to claim 2, wherein the controller determines whether the suction of the objects to be picked up through the gripper and the grasping of the objects to be picked up through the clamps are performed simultaneously according to the sizes of the objects to be picked up.

5. The depalletizing system according to claim 1, wherein the image data comprises images or videos.

6. The depalletizing system according to claim 1, wherein if it is determined that the plurality of objects have the same top level as the reference object, the controller determines that all of the objects are of the same kind to control the picking robot so that the reference object and the neighboring object of the reference object are picked up at a time and moved to the predetermined position.

7. The depalletizing system according to claim 1, wherein the controller receives master information of the plurality of objects and determines whether the reference object and the neighboring object of the reference object are of the same kind based on the master information.

8. The depalletizing system according to claim 7, wherein the master information comprises at least a piece of information of kinds, sizes, weights, delivery addresses, production dates, and current position information of the objects.

9. A method for controlling a depalletizing system for picking up a plurality of objects to move the picked up objects to a predetermined position, comprising the steps of:

acquiring image data of tops of the plurality of objects;

performing vision recognition for the acquired image data of tops of the plurality of objects;

determining whether two neighboring objects among the plurality of objects are pickable at a time according to a vision recognition result; and at a time picking up the two objects determined as pickable objects at a time to move the two objects to the predetermined position, wherein the step of performing vision recognition for the acquired image data of tops of the plurality of objects comprises the steps of producing a depth map from the image data of tops of the plurality of objects and selecting any object that has the highest top level among the plurality of objects as a reference object according to the produced depth map, and the step of determining whether two neighboring objects among the plurality of objects are pickable at a time comprises the step of determining whether the neighboring object of the reference object has the same size and surface image as the reference object to determine whether the reference object and the neighboring object are pickable at a time according to the determined result.

10. The method according to claim 9, wherein the step of determining whether two neighboring objects among the plurality of objects are pickable at a time comprises the step of determining, if it is determined that the plurality of objects have the same top level as the reference object, all of the objects are of the same kind to allow the reference object and the neighboring object to be picked up at a time.

11. The method according to claim 9, further comprising the steps of:

receiving master information of the plurality of objects; and determining whether the reference object and the neighboring object are of the same kind based on the master information.

12. The method according to claim 11, wherein the master information comprises at least a piece of information of kinds, sizes, weights, delivery addresses, production dates, and current position information of the objects.

13. The method according to claim 9, wherein the step of at a time picking up the two objects determined as pickable objects at a time to move the two objects to the predetermined position is carried out by a picking robot comprising: a robot arm with a plurality of joints; a gripper connected to one end of the robot arm to suck the objects to be picked up with a pneumatic pressure; and clamps coupled to sides of the gripper in such a manner as to be rotatable around rotary shafts in a longitudinal direction of the gripper.

14. The method according to claim 13, wherein the gripper comprises a plurality of gripper bodies ascended and descended and having a plurality of gripping units mounted thereon to suck the objects to be picked up thereonto, and the step of at a time picking up the two objects determined as pickable objects at a time to move the two objects to the predetermined position comprises the step of descending at least one of the plurality of gripper bodies according to sizes of the objects to be picked up to allow the descended gripper body to come into contact with the objects to be picked up.

15. The method according to claim 13, wherein the step of at a time picking up the two objects determined as pickable objects at a time to move the two objects to the predetermined position comprises the step of determining whether the suction of the objects to be picked up through the gripper and the grasping of the objects to be picked up through the clamps are performed simultaneously according to the sizes of the objects to be picked up.

16. The method according to claim 9, wherein the image data comprises images or videos.

\* \* \* \* \*